Aug. 31, 1926.
L. LANQUETIN
1,598,586
ELECTRIC APPARATUS SERVING AS A DYNAMO OR MOTOR AND AS AN ENGINE STARTER
Filed July 16, 1925
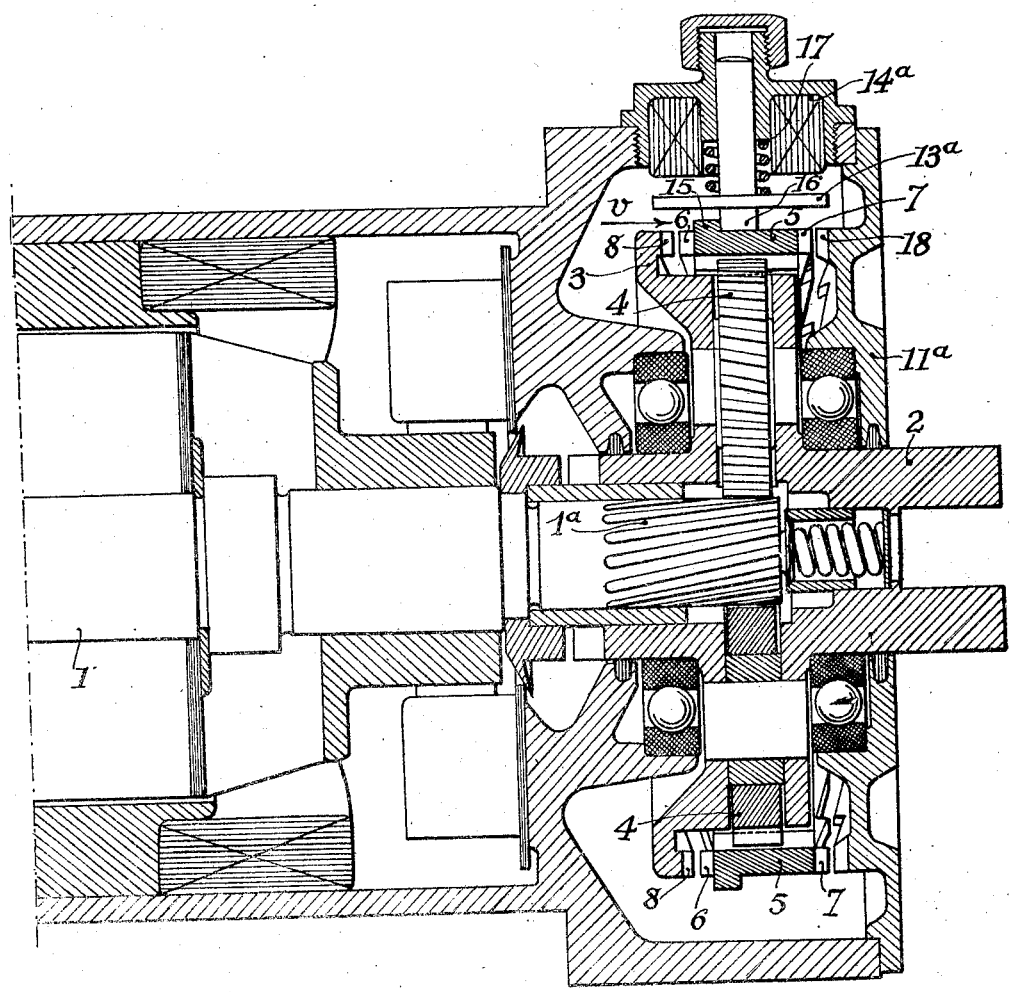

Patented Aug. 31, 1926.

1,598,586

UNITED STATES PATENT OFFICE.

LÉON LANQUETIN, OF PARIS, FRANCE, ASSIGNOR TO SOCIÉTÉ ETABLISSEMENTS DUCELLIER, OF PARIS, FRANCE.

ELECTRIC APPARATUS SERVING AS A DYNAMO OR MOTOR AND AS AN ENGINE STARTER.

Application filed July 16, 1925, Serial No. 44,115, and in France November 5, 1924.

The present invention relates to an electric apparatus serving as a starter for internal combustion engines and also as a dynamo for producing current during the normal operation, in which the armature shaft is connected with the engine shaft by means of a planetary gear set whereof the gear-carrier is coupled to one of the shafts and the toothed ring may be axially displaced, for coupling it either with the said gear holder or with the stationary casing of the apparatus.

Known apparatus of this class is in use in which the toothed ring is provided on its lateral faces with ratchet teeth engaging either with corresponding teeth on one side of the planetary gear carrier or with teeth upon one side of the casing.

In an apparatus of this kind, when the motor is stopped, should a backfire of the engine take place, the toothed ring which was coupled with the planetary gear holder when the apparatus was acting as a dynamo will be displaced and come in gear with the teeth of the casing, the armature being then driven at a multiplied speed. At this time, should the motor suddenly stop, the reactions on the said ring will be changed in direction, so that the ring will be connected with the planetary gear holder and the armature will suddenly stop, thus producing shocks which might damage the teeth.

To obviate this drawback, I employ according to my invention a disappearing stop-piece coacting with an axially movable element of the change-speed box, for example the toothed ring, and I further employ means for the control of the said stop-piece which are put in action by the control of the starter.

The appended drawings show by way of example one embodiment of the invention.

The figure is a lengthwise section of the change-speed box.

1 indicates the shaft of the engine starter upon which is formed the pinion $1^a$; 2 is a shaft which is adapted to be coupled to the engine shaft; 3 is the carrier for the planetary pinion 4; 5 is the toothed ring which is axially movable.

The toothed ring 5 carries on each of its lateral faces clutch teeth 6 and 7 adapted to respectively engage with the clutch teeth formed on one of the sides of the planetary gear holder 3, and with clutch teeth 18 formed on the bottom of the casing $11^a$, according as this ring is displaced in the direction of the arrow $v$ or in the contrary direction.

The faces of the teeth of pinions 8 and 18 are inclined in a reverse direction and the reaction of these inclined faces will be sufficient to cause the axial displacement of the ring 5; nevertheless in order to facilitate this displacement, it is preferable for the pinion $1^a$, the planetary gears 4 and the ring 5 to be of the helical type, as represented.

A circular projection 15 on the external periphery of the toothed ring 5, cooperates with a disappearing stop-piece formed by the stud 16 which is secured to the armature $13^a$ of an electro-magnet $14^a$, so as to prevent all movement of the ring 5 in the direction of the arrow $v$ except during the starting.

At this time, the current in the electromagnet $14^a$ causes the latter to attract the armature $13^a$, against the spring 17, so that the stud 16 will be withdrawn and the ring 5 will be free to move according to the arrow $v$ and to bring its teeth 7 into engagement with the teeth 18 on the casing $11^a$.

After the engine has been started, and the starter ceases to act, the ring 5 will be connected by the teeth 6 and 8 with the planetary pinions carrier, and the stud 16 will prevent it from engaging the casing $11^a$ should a back-fire take place when the engine is stopped.

It is further evident that the said arrangements for protection against the backfire of the engine may be used with automatic change-speed devices differing from the one employed with the apparatus hereinbefore set forth.

Having thus described my apparatus, what I claim as new therein, and my own invention, is:

1. In an electric apparatus serving as a starting motor for the starting of an internal combustion engine and as a dynamo for producing current during the normal operation of said engine, the combination of an armature shaft and a shaft situated in line with the same, the latter shaft being adapted for coupling with the engine shaft, a planetary pinions carrier disposed on the armature shaft, a worm gear mounted on said armature shaft, planetary pinions mounted on the said pinions carrier and adapted to engage the said worm gear, a ring with internal teeth which is axially movable and is adapted to engage the said planetary pinions, abutments provided on the said planetary pinions carrier and on the said toothed ring for engaging the latter with the said pinions carrier when the said ring is displaced in a given direction, abutments provided on the casing of the electric apparatus and on the toother ring for holding said ring in the fixed position when it is displaced in the opposite direction, and controlling means alternatively permitting or preventing the action of the said abutments provided upon the casing of the electric apparatus.

2. In an electric apparatus serving as a starting motor for the starting of an internal combustion engine and as a dynamo for producing current during the normal operation of said engine, the combination of an armature shaft and a shaft situated in line with the same, the latter shaft being adapted for coupling with the engine shaft, a planetary pinions carrier disposed on the armature shaft, a worm gear mounted on said armature shaft, planetary pinions mounted on the said pinions carrier and adapted to engage the said worm gear, a ring with internal teeth which is axially movable and is adapted to engage the said planetary pinions, abutments provided on the said planetary pinions carrier and on the said toothed ring for engaging the latter with the said pinions carrier when the said ring is displaced in a given direction, abutments provided on the casing of the electric apparatus and on the toothed ring for holding the said ring in the fixed position when it is displaced in the opposite direction; said ring having an annular projection upon its external periphery, a disappearing abutment coacting with said projection in order to prevent the said ring from assuming its position of immobilization, a spring urging the said abutment into engagement with the said projection, an electromagnet causing the said abutment to disappear whereby the said toothed ring may be displaced towards the casing and may thus be immobilized.

In testimony whereof I have hereunto affixed my signature.

LÉON LANQUETIN.